United States Patent
Cassarly et al.

[11] Patent Number: 5,515,243
[45] Date of Patent: May 7, 1996

[54] RETROFIT OPTICAL ASSEMBLY FOR LIGHTING SYSTEM

[75] Inventors: William J. Cassarly, Richmond Heights; John M. Davenport, Lyndhurst; Richard L. Hansler, Pepper Pike, all of Ohio

[73] Assignee: General Electric Company, Schenectady, N.Y.

[21] Appl. No.: 329,105

[22] Filed: Oct. 25, 1994

[51] Int. Cl.[6] .................................................. F21V 8/00
[52] U.S. Cl. ........................... 362/32; 362/61; 362/298; 362/299; 362/302
[58] Field of Search ........................... 362/301, 32, 61, 362/298, 299, 346, 302, 303; 385/31, 900–902

[56] References Cited

U.S. PATENT DOCUMENTS

| | | | |
|---|---|---|---|
| 3,772,506 | 11/1973 | Junginger | 362/32 |
| 4,463,410 | 7/1984 | Mori | 362/32 X |
| 4,464,705 | 8/1984 | Horowitz | 362/32 X |
| 4,974,094 | 11/1990 | Morito | 362/32 X |
| 5,278,731 | 1/1994 | Davenport et al. | 362/32 |

*Primary Examiner*—Denise L. Gromada
*Assistant Examiner*—Thomas M. Sember
*Attorney, Agent, or Firm*—George E. Hawranko; Stanley C. Corwin

[57] ABSTRACT

A retrofit optical assembly is provided for automotive headlamps that includes a multi-planar mirror that cooperates with a tapered end of a light guide to reduce glare. In an asymmetric parabolic reflective surface arrangement, the multi-planar mirror is offset from the longitudinal axis of the light guide to equalize the magnification and image size. This also has the beneficial effect of reducing the amount of light loss outside of the parabola.

13 Claims, 2 Drawing Sheets

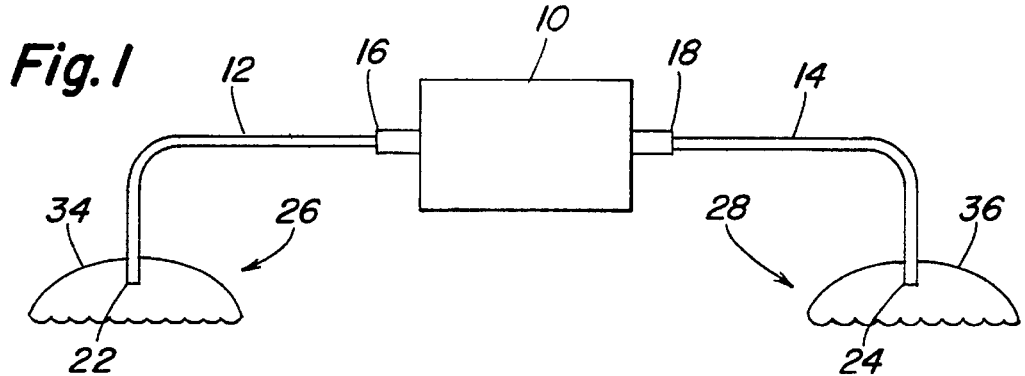
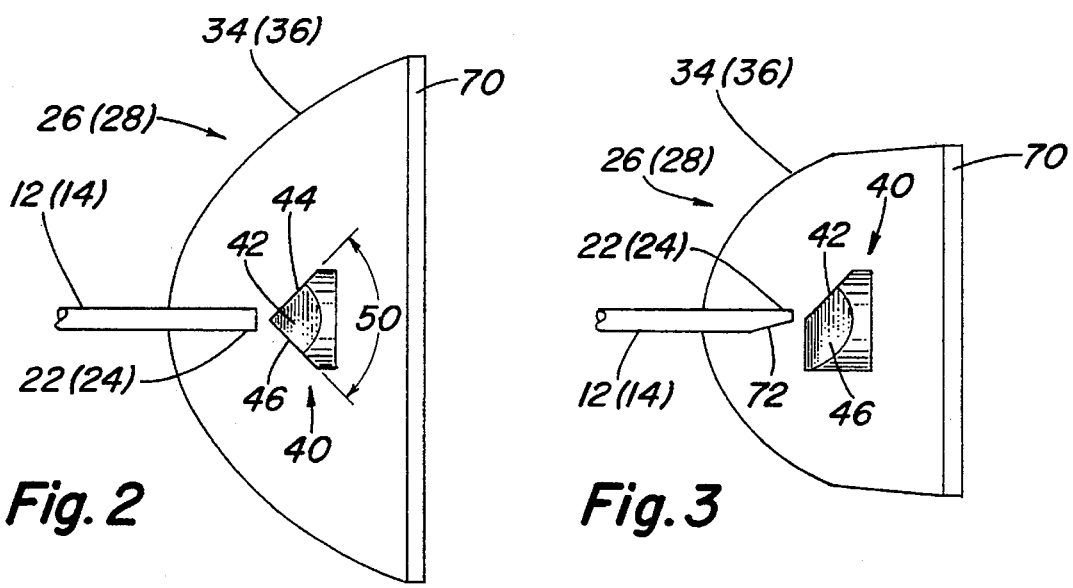
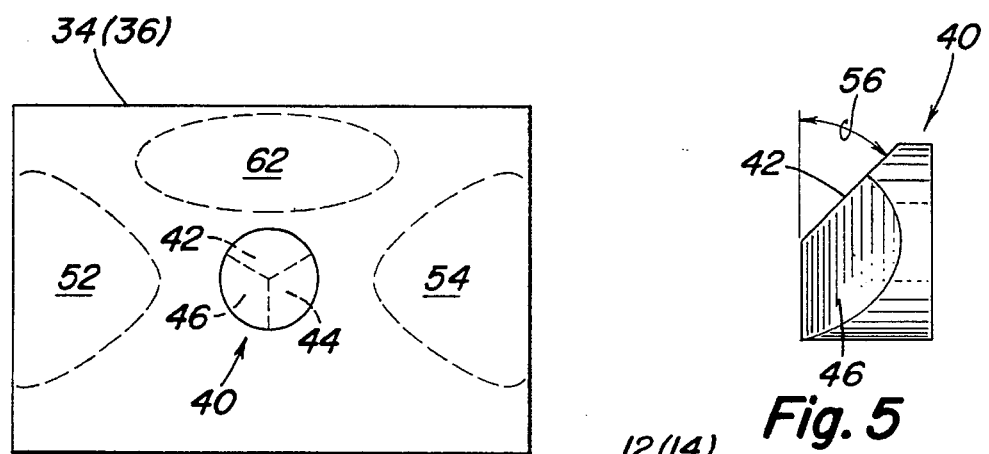
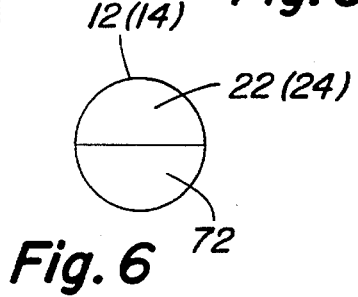

RETROFIT OPTICAL ASSEMBLY FOR LIGHTING SYSTEM

BACKGROUND OF THE INVENTION

This invention relates to a lighting system, particularly one that uses a centralized light source and one or more light guides or light conductors to transmit the light from the light source to a remote location. More particularly, a high brightness light source is envisioned for use in the automotive field where one or more light guides will direct light from the source to various end uses such as headlamps, turn signal indicator lamps, tail lights, interior lamps, etc.

As will be described, the present invention finds particular applicability in retrofitting a conventional halogen incandescent headlamp assembly by using a substantial number of existing components and modifying the assembly to take advantage of the benefits of the centralized lighting system. It will be understood, however, that the invention may be advantageously employed in related environments and applications such as display lighting arrangements or the like without departing from the scope and intent of the subject invention.

U.S. Pat. No. 5,278,731 of Davenport and Hansler (the '731 patent) is assigned to the same assignee as the present application. The '731 patent describes a related retrofit lighting system, the details of the '731 patent being incorporated herein by reference. Generally, it discloses use of a planar mirror that directs light from the output end of a light guide to a curvilinear reflective surface, such as a parabola. The planar mirror is located at or near the focus of the parabolic reflective surface so that collimated light is reflected from the parabolic surface. The light then continues toward a lens that closes the headlamp assembly and the lens directs the light in a desired manner.

Glare is always a concern with regard to light emanating from a headlamp. Particularly, light rays directed from the headlamp and upwardly into the eyes of an oncoming motorist are generally referred to as glare. Therefore, it is necessary to effectively control or handle light rays that would otherwise contribute to glare.

Still another concern in the headlamp environment is to provide as much forward directed light or "punch" as possible. Small angled prisms on the lens provide only a slight re-direction of the light without a substantial loss in the brightness so that light that passes through these portions provides the "punch" to the light pattern. Lenticules, the lens-like elements provided on the lens, spread the light to complete the desired light pattern.

Headlamp design must also take into consideration the configuration of the reflective surface so that light that exits the light guide is effectively and efficiently reflected forward by the reflective surface. The low profile and aerodynamic design of automobiles does not always provide for a symmetric parabolic reflective surface. In those instances where an asymmetric parabolic arrangement is used, the distance from the light source (end of the light guide) to the edges of the reflective surface are not equal. The different dimensions to the parabolic reflective surface edges also result in unequal image sizing. Accordingly, special consideration must be given to this arrangement.

With all of these constraints, it is still necessary to provide an interim, retrofit arrangement that uses many of the optical components of existing headlamp systems. Only selected portions of a centralized lighting system are incorporated into known arrangements to minimize the cost of eventually converting to a complete, centralized lighting system in the future.

SUMMARY OF THE INVENTION

The present invention contemplates a new and improved lighting system that addresses problems associated with glare, as well as optimizing brightness of the light directed outwardly from the headlamp.

In a related arrangement, these same principles are applied to an asymmetric reflective surface that effectively uses light emitted from the light guide and compensates for what would otherwise be unequal images formed by such an arrangement.

According to one aspect of the invention, the output end of the light guide includes a tapered edge to eliminate glare in the road pattern.

According to another aspect of the invention, the light from the light guide is divided into multiple portions, at least two of which are directed through the lens to contribute to the "punch" of the light pattern.

According to still another aspect of the invention, the multi-planar mirror which directs light from the light guide toward the reflective surface is offset from the longitudinal axis of the light guide. This centerline shift and unequal magnification provided by the asymmetric parabola combine to create images that are relatively equal in size.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 1 is a schematic representation of the basic components of a centralized lighting system;

FIG. 2 is an overhead plan view, partly in cross section, illustrating components of a headlamp assembly in accordance with the teachings of the subject invention;

FIG. 3 is a side view of the headlamp assembly of FIG. 2;

FIG. 4 is an end view of the multi-planar mirror and a schematic representation of distinct light portions formed by the multi-planar mirror;

FIG. 5 is a side elevational view of the multi-planar mirror;

FIG. 6 is an end view of the output end of the light guide;

DETAILED DESCRIPTION OF THE PREFERRED EMBODIMENTS

Figure 7:
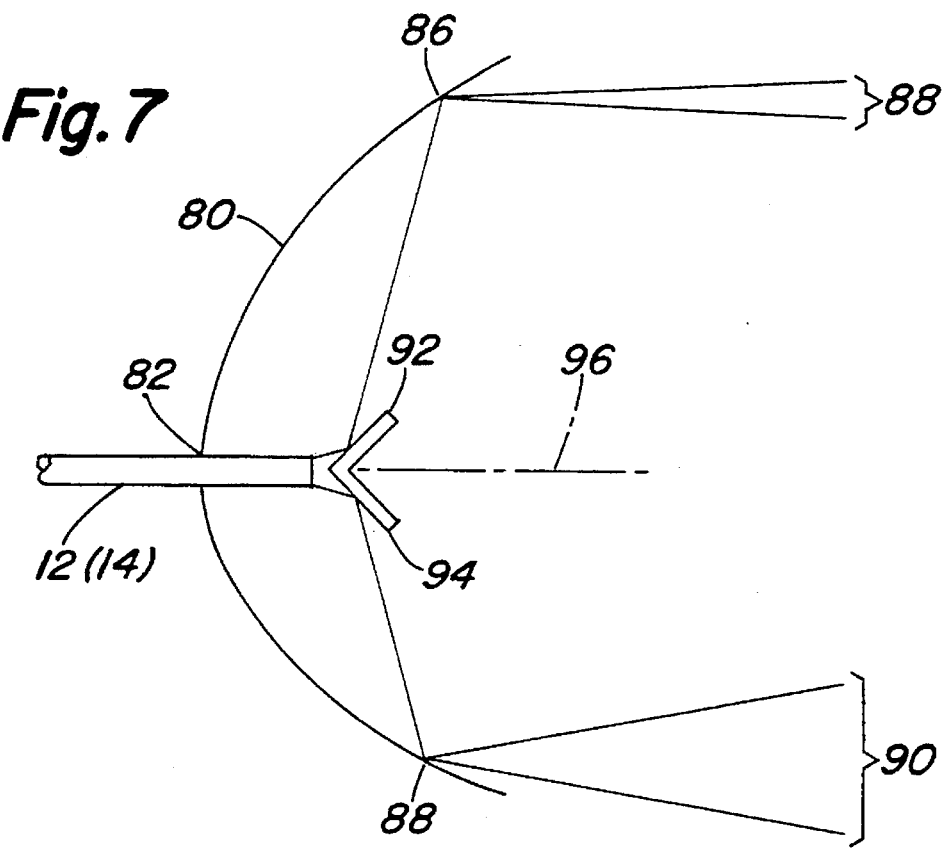
FIG. 7 is a schematic representation of difficulties encountered with an asymmetric parabolic reflector; and, FIG. 8 illustrates a preferred solution to the asymmetric parabola arrangement of FIG. 7 in accordance with the teachings of the subject invention.

Referring now to the drawings wherein the showings are for the purposes of illustrating the preferred embodiments of the invention only and not for purposes of limiting same, FIG. 1 shows a centralized light source 10 which is a high brightness light source that has two or more light guides 12, 14 connected thereto. The light guides are preferably connected at input ends to the light source through coupling members 16, 18 that provide a smooth optical transition with low loss between the light source and the light guides. The light continues to travel from the light source through the guides to output ends 22, 24 which are shown as terminating within respective headlamps 26, 28. Preferably, and as will become more apparent from the following discussion, the light guides are received through an opening in the rear of the headlamp and enter generally along a longitudinal axis thereof. The terminal or output end of each light guide is located at or adjacent the focus of respective reflective surfaces 34, 36. The reflective surfaces 34, 36 are generally referred to as curvilinear and may be parabolic, spherical, compound parabolic collecting surfaces or other appropriate geometrical surface configurations.

With continued reference to FIG. 1, and additional reference to FIGS. 2–4, the discussion of one headlamp assembly will be deemed equally applicable to the other headlamp, unless specifically noted to the contrary. Light that exits the output end of the light guide is directed toward a multiplanar mirror 40 which in the first preferred arrangement includes three planar surfaces 42, 44, 46. As best illustrated in FIG. 2, the second and third surfaces 44, 46 of the tri-mirror are separated by an angle denoted by reference numeral 50. In the preferred embodiment, this angle has a magnitude of approximately 90° to 120° to direct portions of the light exiting the light guide toward spaced regions 52, 54 on the reflective surface 34 (FIG. 4).

Moreover, as shown in FIG. 5, the first surface 42 is disposed at an angle represented by numeral 56 on the order of approximately 30° to 45°. Generally, and as best illustrated in FIGS. 3 and 4, the light reflected by this third surface is directed upwardly toward an upper region 62 of the reflective surface. As will be understood, these angle dimensions are preferred for a three surface mirror, or tri-mirror, and the angles may vary if still other multi-planar mirrors or optical arrangements are used.

Light as it exits the light guide 12 is generally propagated along the longitudinal axis of the guide, which happens to coincide with the longitudinal axis of the reflective surface 34. As described in greater detail in U.S. Pat. No. 5,278,731, the mirrored surfaces are located closely adjacent the focus of the parabolic reflective surface 34. If the vertex of the mirrors is spaced from the output end of the light guide, the light rays exiting the guide will be reflected rearwardly toward the parabolic surface 34 and miss the output end of the light guide. In an alternative arrangement, the vertex of the mirrors can be located closely adjacent the terminal end of the light guide. In either arrangement, light is redirected by the mirror toward the parabolic reflective surface to define the three reflective portions 52, 54, 62. Preferably, at least two of these portions 52, 54 are selected so that light reflected from reflective surface 34 at these regions is directed to "clear" portions of lens 70, i.e., regions of the lens having small angled prisms that only slightly alter the direction of the light passing therethrough without significantly affecting the brightness. Optimized brightness is achieved by directing a greater portion of the light to regions 52, 54 which redirect the path of rays from these regions toward "clear" regions of the lens.

Light from the third portion 62 is directed to lenticules formed in the headlamp lens. The lenticules are small lenslets formed in the lens that split or spread light in the horizontal direction and result in the majority of the spread light for a desired headlamp beam pattern.

As best shown in FIGS. 3 and 6, the output end 22 of the light guide has a smaller cross-sectional dimension than the cross-sectional area of the remainder of the light guide. This is achieved via a tapered region 72 which is particularly useful in eliminating glare from the beam pattern of the headlamp. Glare is most often associated with light directed in an upward direction, and into the eyes of an oncoming driver. The tapered edge provides a flat portion that defines a clean edge in the road pattern and minimizes the glare. Of course other arrangements providing a clean edge to the light before it is directed by the reflective surface 34 can be used with equal success, although the tapered light guide is presently the preferred manner of achieving this objective since the light is not lost.

Figure 8:
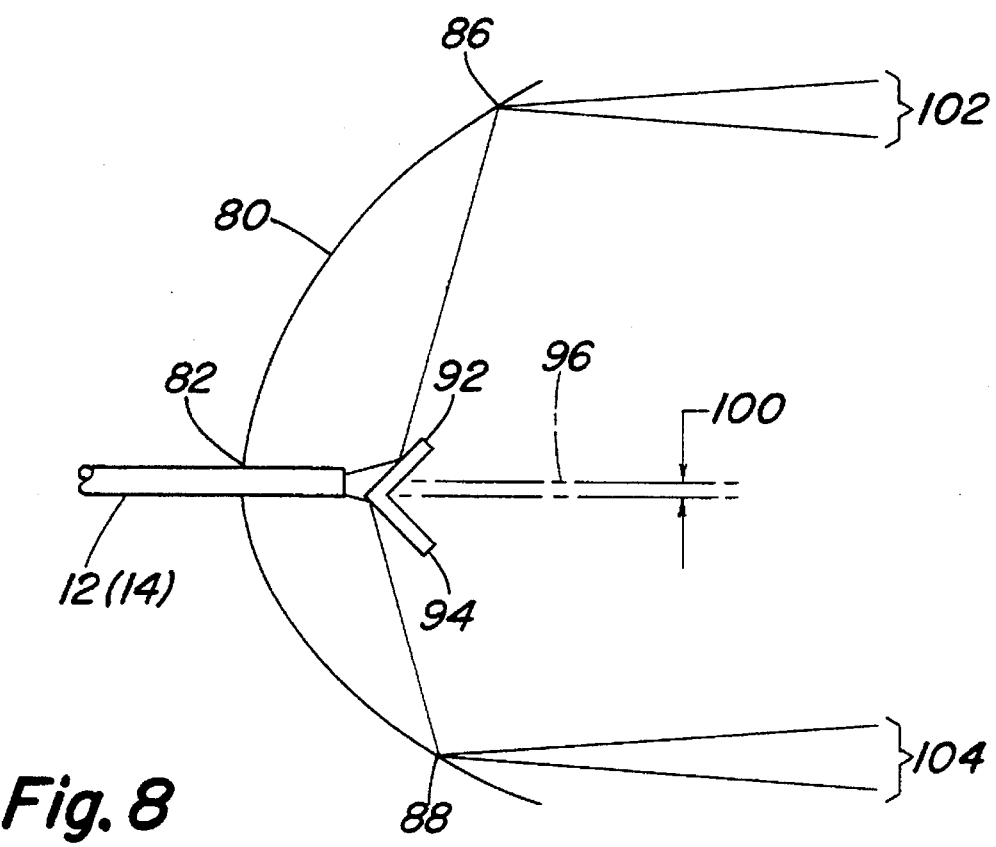

Turning now to another embodiment shown in FIGS. 7 and 8, an asymmetrical parabolic reflective surface 80 has an opening 82 that receives a light guide 12 therethrough. As best illustrated in FIG. 7, light directed toward one edge 86 of the reflective surface by the V-mirror is in turn directed forwardly to form a reduced size image 88. Likewise, a magnification results from light directed toward edge 88 that forms an enlarged image 90. Thus, with an asymmetrical parabolic reflective surface, two different size images 88, 90 result. In this arrangement, the vertex of the mirrored surfaces 92, 94 is positioned on the longitudinal axis 96 of the light guide.

As shown in FIG. 8, the vertex is preferably shifted by a predetermined dimension represented by numeral 100 to achieve generally equal size images 102, 104. An additional benefit is derived from the offset of the V-mirror. That is, since the light guide enters through an opening that is more closely adjacent edge 88 than edge 86, there is less parabolic surface area on the one side 88 than there is on the other side 86. More light is typically lost outside the parabolic reflective surface associated with the side containing edge 88. By offsetting the V-mirror as represented by numeral 100, a reduced portion of the light is directed to the smaller side of the reflective surface that contains edge 88, thereby reducing the overall loss of light in the system. Of course the vertex of the V-mirror may be offset from the longitudinal axis of the light guide by alternatively shifting the position of the light guide by a predetermined dimension to achieve generally equal size images 102, 104.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What we claim as new and desire to secure by Letters Patent of the United States is:

1. A lighting system for transmitting light from an associated light source to a remote location, the lighting system comprising:

a light guide having an input end adapted to receive light from an associated light source, and an output end for directing light outwardly therefrom in a pattern that has a substantially linear edge;

a mirrored surface receiving light from the output end of the light guide and re-directing the light;

a curved reflective surface receiving the re-directed light from the mirrored surface and further directing the light in a predetermined direction; and wherein the light guide includes a tapering wall portion that reduces the cross-sectional dimension of the light guide adjacent the output end, the tapering wall portion providing the substantially linear edge in the light pattern emitted from the light guide.

2. The lighting system as defined in claim 1 wherein the mirrored surface includes at least first, second, and third planar surfaces angularly disposed relative to one another for re-directing light toward different portions of the curved reflective surface.

3. The lighting system as defined in claim 1 wherein the curved reflective surface has a parabolic configuration defined by a truncated parabola.

4. The lighting system as defined in claim 1 wherein the light guide passes through the curved reflective surface generally along a longitudinal axis thereof.

5. The lighting system as defined in claim 1 wherein the curved reflective surface is an asymmetrical surface and the output end of the light guide is closer to one edge of the reflective surface than the other to substantially equalize the size of the images created by different sides of the reflective surface.

6. The lighting system as defined in claim 1 further comprising a lens located relative to the reflective surface to receive light further directed therefrom and wherein the mirrored surface includes first and second planar surfaces angularly disposed relative to one another, light re-directed by the first planar surface eventually passing through a substantially clear portion of the lens to contribute non-diffused light to a predetermined beam pattern.

7. The lighting system as defined in claim 6 wherein light re-directed by the second planar surface eventually passes through a lenticular arrangement on the lens to contribute diffused light to the predetermined beam pattern.

8. A lighting system for transmitting light emitted from a light source to a remote location, the system comprising:

an optical light guide adapted to receive light from an associated light source and distribute the light to an output end thereof, the output end of the light guide tapering from a first predetermined cross-sectional dimension to a reduced second cross-sectional dimension of the light guide for increasing the angle of the light exiting therefrom;

a mirrored surface for receiving light distributed from the output end of the light guide and re-directing the light;

a curved reflective surface receiving the re-directed light from the mirrored surface and further directing the light toward a desired location; and, wherein the mirrored surface includes at least first, second, and third planar surfaces angularly disposed relative to on another for re-directing light toward different portions of the curved reflective surface.

9. The lighting system as defined in claim 8 wherein the curved reflective surface is an asymmetrical surface and the output end of the light guide is closer to one edge of the reflective surface than the other and is offset from the mirrored surface to substantially equalize the size of the images created by different sides of the reflective surface.

10. The lighting system as defined in claim 8 further comprising a lens located relative to the reflective surface to receive light further directed therefrom and wherein the mirrored surface includes first and second planar surfaces angularly disposed relative to one another, light re-directed by the first planar surface eventually passing through a substantially clear portion of the lens to contribute non-diffused light to a predetermined beam pattern.

11. The lighting system as defined in claim 10 wherein light re-directed by the second planar surface eventually passes through a lenticular arrangement on the lens to contribute diffused light to the predetermined beam pattern.

12. A lighting system for transmitting light emitted by a light source to a remote location, the lighting system comprising:

a light guide having an input end that receives light from the light source and an output end generally directed along a longitudinal axis from which the light exits the light guide;

a curvilinear reflecting surface that receives the light guide therethrough at a region offset from a central axis;

a multi-planar mirrored surface disposed adjacent the output end of the light guide for receiving light therefrom and directing it toward the reflecting surface, a vertex of the mirrored surface being offset from the longitudinal axis of the light guide output end for equalizing image sizes formed by the light directed from the asymmetric reflecting surface.

13. The lighting system as defined in claim 12 wherein the multi-planar mirrored surface includes first, second and third planar surfaces.

* * * * *